Dec. 15, 1964   W. M. P. STUART   3,161,752
CURRENT SUPPLY INCLUDING HIGH FREQUENCY COMPONENT
FOR SPARK EROSION MACHINING APPARATUS
Filed Jan. 16, 1962

INVENTOR
WHITFIELD M. P. STUART

BY
*Featherstonhaugh & Co.*
ATTORNEYS

United States Patent Office 3,161,752
Patented Dec. 15, 1964

3,161,752
CURRENT SUPPLY INCLUDING HIGH FREQUENCY COMPONENT FOR SPARK EROSION MACHINING APPARATUS
Whitfield M.P. Stuart, 5910 Charles St., North Burnaby, British Columbia, Canada
Filed Jan. 16, 1962, Ser. No. 166,532
2 Claims. (Cl. 219—69)

This invention relates to apparatus for machining or shaping metals or other conductors of electricity.

Machining or shaping by means of spark erosion is not new. Spark erosion machining makes use of the fact that erosion occurs when a spark is passed between two pieces of metal or electrodes. Metal is removed by a series of momentarily heavy electrical discharges across a gap between the two electrodes separated by a dielectric fluid. Each spark produces localized melting and partial evaporation of the surface metal and thereby erodes both electrodes. When voltage is applied to the electrodes at the gap, a discharge takes place when the gap reaches a critical value. Therefore, the critical spacing of the electrodes is maintained as close as possible, so that individual discharges take place constantly. The workpiece is usually made the anode since electrode wear is more rapid at the anode than at the cathode. The cathode is usually referred to generally as the electrode, as distinguished from the workpiece, and is shaped to produce a desired effect in or on the workpiece. As erosion takes place, the electrode is moved towards the workpiece by a servo-mechanism in an effort to maintain a substantially constant gap.

For proper operation, there must be a continuous series of sparks without arcing. A spark is the passage of electricity across a gap of an instantaneous nature or very short duration, such as is caused by the discharge of a condenser across a gap; whereas an arc is the passage of electricity across a gap of a continuous or self-sustaining nature, such as obtained in arc welding apparatus. Arcing causes overheating, cracking of the workpiece, a rough and unsatisfactory surface, a loss of cutting time, since little erosion takes place during arcing, and it requires elaborate equipment to break the arcs and to reset the electrodes. However, with the prior machines, some arcing is taking place continuously so that the servo-mechanism is constantly moving the electrode away from the workpiece to break the arc and back again to a substantially correct gap setting. This has reduced greatly the effectiveness of the prior art machines. The continuous arcing slows the machining process down very much, is harmful to the workpiece and leaves a very rough surface. In addition to this, very sensitive mechanism must be provided for raising and lowering the electrode, and the weight of the latter is therefore limited by the fact that it must be constantly shifted back and forth relative to the workpiece.

Servo-mechanisms for this purpose are well known in the art. For example, an electric servo-motor may be coupled through a reduction gear box to a pinion meshing with a rack on a vertical slide which feeds the cutting electrode to maintain a substantially constant spark gap. The theory is that as erosion takes place, the gap is increased. By measurement of the consequent voltage drop, a feedback control system energizes the servo-mechanism to feed the cutting electrode forwardly until the gap reaches the required value and sparking takes place again.

In the known spark erosion apparatus, the constant arcing is not only injurious to the workpiece, but there is a constant loss of working time resulting from the actual arcing and by the action of lifting the electrode to break the arc and the returning of the electrode to the predetermined gap. This necessitates heavy and expensive equipment, and limits the size of the work that can be done because of the inertia of the electrode.

Energy for the spark is provided in one known system by a static "relaxation circuit." A relaxation circuit is a resistance-capacitance network in which energy is alternately stored in capacitors or condensers and discharged in pulses. Transformers, rectifiers and a smoothing circuit provide a suitable direct current supply. The above-noted disadvantages exist with this type of apparatus. The constant arcing has been considered an unavoidable inconvenience. It was assumed that when a spark jumped the gap between an electrode and a workpiece, a crater was formed thereby widening the gap. The servo-mechanism was supposed to advance the electrode to maintain a constant gap. The condensers of the relaxation circuits were charged by a constant voltage direct current supply to produce condenser discharges sufficient to jump the theoretically constant gap. As a result, any lessening of the gap by unevenness of the adjacent surfaces of the electrode and workpiece or by swarf or particles therebetween resulted in arcing which, as stated above, was constantly taking place.

The present invention is concerned with improvements associated with relaxation circuits. The change relative to the relaxation circuits is quite simple, but the results are drastic. The basic improvement is the elimination of arcing, excepting for malfunctioning of the apparatus. This results in a rate of cutting which is very many times that of the spark machines on the market. In addition, an undamaged and smoother surface is obtained on the workpiece, and simpler, less expensive equipment may be used than heretofore possible.

In the prior art, a steady flow of current is provided to the relaxation circuits so that the condensers or capacitors thereof discharge when loaded to a predetermined voltage which is determined by the gap, thereby creating a spark between the electrode and the workpiece. This is based on the false assumption that the gap remains substantially constant. According to the present invention, a pulsating direct current is supplied to the relaxation circuit. The pulsations of the direct current rise from substantially zero, reach a peak and return to substantially zero. These pulses range from about 200 to about 20,000 pulses per second. This current preferably has a wave form roughly in the shape of one-half of a sine wave. The pulsating current may be produced in any desired manner, but is is preferable to use a driven alternator, the voltage from which is controlled in the usual fashion by altering the flux density in the field coils. The alternating current produced is rectified to produce pulses having the shape of substantially one-half a sine wave. However, a direct current pulse generator may be used instead. The main thing is the supplying of a pulsating direct current to the capacitors so that correct voltages are produced by said capacitors for gaps of many different sizes between the electrode and the workpiece. This is necessitated by the fact that the gaps and conditions are constantly changing between the two electrodes and at different places therebetween.

During the development of the present invention, it has been discovered that the effective gap between the electrode is constantly changing and, therefore, it is necessary to be able to produce sparks for an infinite variety of gaps. By utilizing a pulsating voltage direct current supply, the correct voltage for any gap is almost instantaneously available. However, should arcing occur, it is stopped by the falling voltage of the supply current before the servo-mechanism can start to operate. The supply voltage drops below the point where the discharge voltage is sufficient to jump the gap when the arcing is taking place. During each cycle of the supply voltage, the condensers may discharge many times as their discharge voltages reach the correct values for the many different gaps that always exist between the electrode and workpiece. Thus, arcing very seldom takes place, thereby eliminating delays in working time (by the actual arcing and by the operation of the servo-mechanism) and damage to the workpiece. In addition to this, the work is done by a great many light or small blows to the surface instead of a comparatively few heavy blows.

This invention will be more readily understood by reference to the accompanying drawings, in which.

Figure 5:
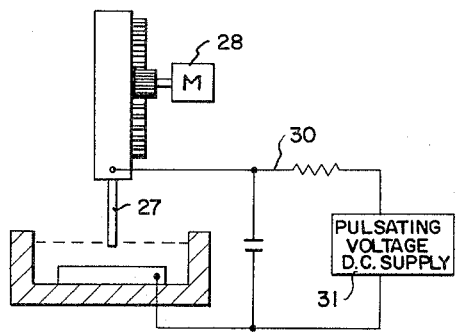
Figure 6:
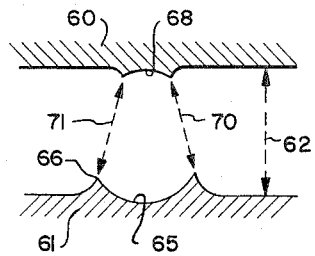

FIGURE 5 diagrammatically illustrates apparatus incorporating this invention;

FIGURE 6 is a diagram illustrating one situation during spark erosion; and

Figure 7:
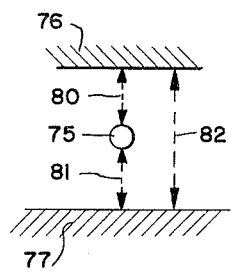

FIGURE 7 is a diagram illustrating another situation during spark erosion.

Figure 1:
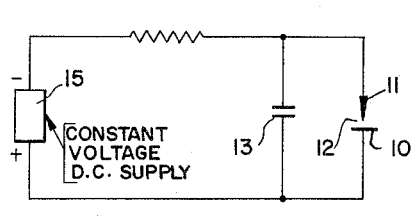
FIGURE 1 is a simplified prior art relaxation circuit.
Figure 2:
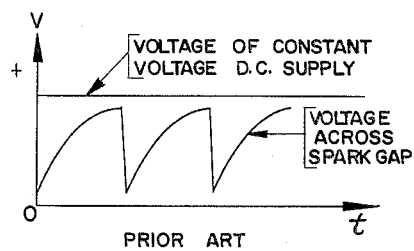
FIGURE 2 illustrates the discharge wave form resulting when a constant voltage direct current supply is used with a relaxation circuit.

FIGURE 1 illustrates a standard relaxation circuit including workpiece 10 and electrode 11 separated by a gap 12. A condenser 13 is connected across the gap between the electrode and workpiece. A suitable constant voltage direct current supply 15 is connected to the circuit, and includes the usual transformers, rectifiers, and a smoothing circuit. FIGURE 2 illustrates substantially the wave form of the voltage across the gap with this standard arrangement. A suitable dielectric fluid (not shown) separates the workpiece and electrode.

Figure 3:
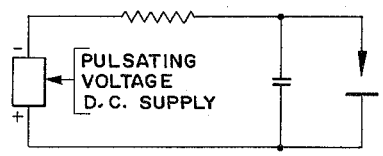
FIGURE 3 illustrates a relaxation circuit with a pulsating voltage direct current supply source in accordance with this invention.
Figure 4:
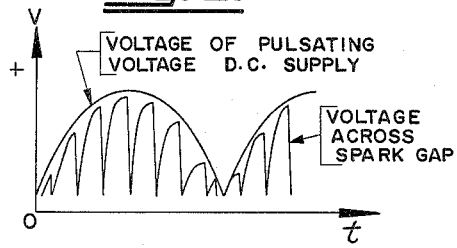
FIGURE 4 illustrates the wave forms of the voltage of the pulsating direct current supply and of the discharge voltage across the spark gap.

As stated above, the present invention consists primarily of supplying a pulsating direct current to a relaxation circuit instead of a constant direct current supply. A relaxation circuit is shown in FIGURE 3 with a pulsating voltage direct current supply connected thereto in accordance with this invention. FIGURE 4 illustrates roughly the wave forms of the voltage of the pulsating supply voltage consecutively rise from about zero to a higher voltage and then return to about zero. In other words, the charging pulses increase in voltage to a peak and then return to the original value. The minimum value must be low enough to cut off any arc that may be formed between the electrode and workpiece while the maximum value depends on the work to be done and the size of the electrode and workpiece.

FIGURE 5 diagrammatically illustrates standard spark erosion apparatus including a workpiece 25, an electrode 27 mounted for movement towards and away from the workpiece by means of suitable servo-mechanism, indicated at 28. A relaxation circuit 30 is connected to the electrode and workpiece, and a pulsating voltage direct current according to this invention is supplied to said circuit by a suitable source 31. This source may, for example, be an alternator or alternating current generator adapted to deliver approximately 500 cycles per second, and a rectifier system capable of rectifying the alternator output; or an alternating current generator with a commutator with its bars so arranged as to produce a pulsating direct current. A suitable dielectric fluid separates the workpiece and electrode. This is preferably a standard dielectric liquid for this purpose which usually is circulated according to standard practice, but it may be air, in which case the gap between the workpiece and electrode would have to be greater than when liquid is used, and the air would have to be blown through the gap in order to remove the swarf.

FIGURE 6 diagrammatically illustrates an electrode 60 and a workpiece 61 with a set gap 62 therebetween. When a spark travels between the electrode and the workpiece, a crater 65 is formed in the workpiece and raises a ridge 66 around said crater. At the same time, a very small crater 68 is formed in the electrode. As soon as this takes place, the effective gap between the electrode and workpiece lessens considerably at 70. The next spark travels across gap 70, eliminating the part of the ridge at this gap. Theoretically the next spark will travel across gap 71 which now is the smallest gap. With the present invention, the pulsating charging current charges the condensers and as soon as the voltage is exactly right for gap 70, the condensers discharge in a spark jumping the gap. Similarly, there will be a correct discharge voltage for gap 71 with an instantaneous discharge of the condensers across said gap so that the discharge voltage cannot build up sufficiently to create an arc between the electrode and workpiece. There are literally hundreds of gaps of different sizes between the electrode and the workpiece, and the correct voltages only are created for the different gaps. A lot of little sparks are created rather than a few big sparks.

FIGURE 7 illustrates one way in which arcs are created. The swarf or particles of metal that are knocked out of the electrodes by the sparks float in the main gap between them. The dielectric medium is usually agitated or pumped through the gap in order to remove the swarf as quickly as possible. However, even then the removal is comparatively slow. In FIGURE 7, a particle 75 is shown between electrode 76 and workpiece 77. With the standard relaxation circuit, a heavy spark jumps between the two electrodes through the particle, and since gaps 80 and 81 between the particle and the electrodes are very small compared to the main gap 82 therebetween, arcing takes place. As long as the arc is formed, the condenser is short circuited and so the apparatus has in effect gone out of working commission to say nothing of the damage done by the arc. This continues until the servo-mechanism moves electrode 76 away from workpiece 77 to create a gap that cannot be overcome by the available voltage. Then the electrode is returned to produce what is considered a correct main gap. Considerable working time is lost during this arcing and the consequent adjustment necessary to break it and to restore the correct gap.

With the present pulsating direct current supply for the relaxation circuit under the same circumstances, a discharge voltage of just sufficient value to jump gap 80 and gap 81 is reached. The resulting spark shatters particle 75, thereby immediately restoring the main gap between the two electrodes. The very small particles formed by the shattering of particle 75 are quickly washed out of the main gap, but in any case at least the above-described action takes place at each of the smaller particles until they are eliminated. As a result of this, the blow developed by each spark is only sufficient to do the desired job so that the craters formed in the workpiece are comparatively small, and there are many of these spark blows each instant. This results in a smooth finish. On the other hand, with the prior circuits when all the sparks were substantially of the same intensity, the blows are about equal and comparatively few, resulting in a very rough surface unless the voltage is cut down to a point where it is not practical to operate. Any effort to increase the speed of cutting merely resulted in a rougher surface, requiring a finishing operation after the erosion operation.

In prior art, condensers had to be charged through high resistances in order to protect the charging source from heavy overloads caused by arcing. In the present invention, the arcs are automatically cut off by the pulsating supply voltage, and so it is possible to reduce the required charging resistance, thereby allowing the condensers to charge at a much greater rate, resulting in the discharge of more sparks in a given time, thereby further materially increasing the rate of operation. Further, using a given charging voltage, the amperes handled by a capacitance of a given value increase with the frequency in pulses per second of the charging current. Thus, the rate of metal removal with a given capacitor is increased by the use of a pulsating charging current, or a smaller capacitance may be used for a given rate of metal removal.

As the servo-mechanism does not have to keep lifting the electrode, a much larger electrode may be used in a given machine than has heretofore been possible. In newly designed equipment, the servo-mechanism is merely a feeding means and merely functons as a safety factor in the event of malfunctioning of the apparatus so that such mechanism does not have to be as powerful, sensitive and elaborate as in the past.

What I claim as my invention is:

1. In an apparatus for spark erosion machining operations on an electrically conductive workpiece,
    a machining electrode
    a terminal spaced from said electrode to define a spark discharge gap therebetween,
    means for positioning said electrode in predetermined spaced relationship with said terminal to maintain said spark discharge gap,
    a singular pulsating high frequency direct current source and circuit means connecting said electrode and said terminal serially therewith to form a machining circuit to supply a pulsating charging current across said gap, the frequency of said pulsating charging current ranging from 200 to 20,000 pulses per second,
    said circuit means including means for supplying pulsations of said charging current having a wave-form substantially the shape of one-half of a sine wave and rising from substantially zero to a peak and dropping to substantially zero with said pulsations recurring continuously without any time lapse therebetween,
    said last-named means including resistance-capacitance relaxation circuit means connected between said source and said electrode-terminal gap and including a resistance in series with said source and said electrode and a condenser across said gap and across said source and said resistance, for discharging at a frequency greater than the frequency of pulsations of said charging current across said gap.

2. In an apparatus as claimed in claim 1 and further comprising a dielectic fluid in said gap between said electrode and said workpiece.

References Cited in the file of this patent

UNITED STATES PATENTS

| | | |
|---|---|---|
| 2,756,316 | Teubner | July 24, 1956 |
| 2,856,565 | Matulaitus | Oct. 14, 1958 |
| 2,886,693 | Harris et al. | May 12, 1959 |
| 3,014,155 | Inoue | Dec. 19, 1961 |
| 3,020,448 | Fefer | Feb. 6, 1962 |